No. 721,674. PATENTED MAR. 3, 1903.
T. G. DAVIS.
TOY.
APPLICATION FILED JUNE 14, 1902.
NO MODEL.
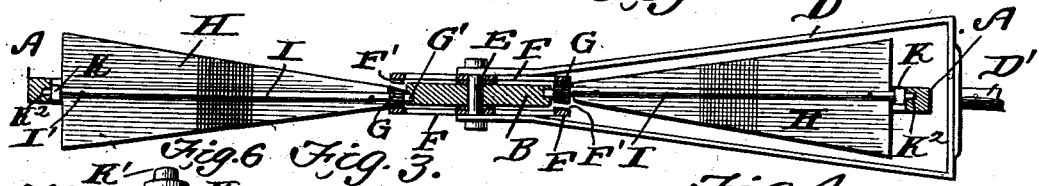
Inventor
Thomas G. Davis.
Witnesses
By
Attorneys

UNITED STATES PATENT OFFICE.

THOMAS G. DAVIS, OF YOUNGSTOWN, OHIO.

TOY.

SPECIFICATION forming part of Letters Patent No. 721,674, dated March 3, 1903.

Application filed June 14, 1902. Serial No. 111,677. (No model.)

*To all whom it may concern:*

Be it known that I, THOMAS G. DAVIS, a citizen of the United States, residing at Youngstown, in the county of Mahoning and State of Ohio, have invented a new and useful Improvement in Toys, of which the following is a specification.

This invention relates generally to toys, and more particularly to that class thereof known as "trundles" or "hoops."

The object of this invention is to provide a toy of this class which will be amusing and pleasing to children by providing a trundling-hoop having a series of spokes carrying colored blades, said spokes and blades being revolved as the hoop is rolled.

Another object is to provide for rotating the blades alternately in opposite directions, thereby increasing the novel feature of the toy.

With these objects in view the invention consists, essentially, of a hoop connected to the central hub, which is provided with a handle and a series of rotatable blades arranged between the hub and hoop and provided with means for rotating the said blades alternately in opposite directions.

The invention consists also in certain details of construction and novelties of combination, all of which will be fully described hereinafter and pointed out in the claims.

In the drawings forming part of this specification, Figure 1 is a perspective view showing a toy constructed in accordance with my invention and also illustrating the practical application of the same. Fig. 2 is a horizontal sectional view of the toy. Fig. 3 is a detail view of the hub and one of the operating-rims, parts being shown in section and other parts in elevation. Fig. 4 is an edge view of a portion of the hub and also a portion of the toothed rims arranged upon sides of the hub. Figs. 5 and 6 show details of construction.

In constructing a toy in accordance with my invention I employ a hoop A, which is connected to a hub B by means of a series of spokes C. Trundling-handle D is pivotally connected to the axle E of the hub, said trundling-handle being bifurcated, as shown, and shaped to permit a rolling motion of the hub and also the rotating motion of the blades hereinafter fully described, said trundling-handle being provided with a suitable grip D'. Circular rims F are mounted upon the axle E upon opposite sides of the hub B and are rigidly secured to the trundling-handle D, said circular rims being provided with teeth F' upon their inner faces, or upon those faces adjacent to the hub. These two rims are adapted to engage a series of gears G, the stub-axles G' of the said gears being journaled in the periphery of the hub B, and it will be noted that the said gears are arranged alternately upon opposite sides of the central line of the said hub, so that one gear will mesh with the toothed rim upon one side of the hub, while the next adjacent gear will mesh with a toothed rim upon the opposite side of the hub, and by this construction and arrangement one gear is rotated in one direction and the other gear in the opposite direction. This scheme is maintained through the entire series of gears. Each gear G has a blade H connected thereto, said blade being preferably made of sheet metal and colored in any desired manner calculated to please children. It will thus be seen that as the hoop is rolled along by means of the trundling-handle a series of colored blades will be rotated within the hoop and, furthermore, will be rotated alternately in opposite directions, thereby producing an exceedingly pleasing and entertaining effect.

I have stated that the blades H are connected to the gears G, and it is obvious that any suitable method of connecting the said parts may be employed; but in practice I prefer to arrange the strips H between the sections of a rod I, the inner ends of the said sectional rod being seated in a socket $G^2$, produced in the gear, while their outer ends are held together by a cap-piece K, having a reduced end K', which fits into a socket $K^2$, produced in the inner face of the hoop A, and one or more nails or screws I' may be passed through the sectional rod I and blade H for the purpose of securely binding them together. Blades are preferably made wider at their outer ends, thereby carrying more color. As before stated, the trundling-handle is shaped to permit the rotation of the said blades as the hoop is rolled along.

It will thus be seen that I provide an exceedingly cheap, simple, and amusing toy comprising a hub, a handle, a series of colored blades arranged within the hub and adapted to be rotated alternately in opposite directions as the said hub is rolled along.

Having thus fully described my invention, what I claim as new, and desire to secure by Letters Patent, is—

1. A toy comprising a hub having a series of blades arranged therein together with means for rotating each blade as the hoop is rolled along.

2. A toy comprising a hoop having a series of blades arranged therein, together with means for rotating the said blades alternately in opposite directions as the hoop is rolled along.

3. A toy comprising a hoop, a series of blades arranged therein each blade being adapted to rotate independent of the others, a handle and means connected to the handle for rotating the blades as the hoop is rolled along.

4. A toy comprising a hoop having a series of blades arranged therein, a handle for rolling the hoop and means connected to the handle for rotating the said blades alternately in opposite directions as the hoop is rolled along.

5. A toy comprising a hub, a series of blades having gears connected to their inner ends, a handle pivotally connected to a hub of the hoop and having a toothed rim connected thereto adapted to engage the gears for the purpose of rotating the blades, as set forth.

6. A toy comprising a hub, a hoop, a series of blades rotatably held between the hub and hoop and having gears upon their inner ends, said gears being arranged alternately upon opposite sides of the central line of the hub, and a handle pivotally connected to the hub having toothed rims adapted to engage the gears whereby the blades are rotated alternately in opposite directions as the hub is rolled along.

THOMAS G. DAVIS.

Witnesses:
A. J. NICHOLAS,
LILLIAN THOMAS.